Figure 1:
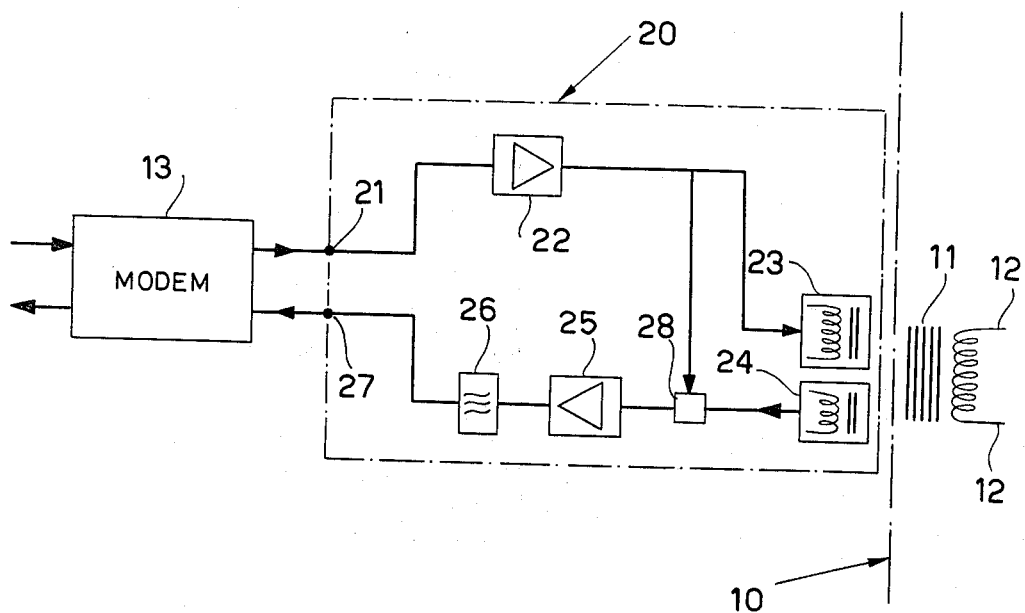

United States Patent [19]

Gray

[11] 4,415,769

[45] Nov. 15, 1983

[54] ELECTROMAGNETIC TELEPHONE COUPLING DEVICE

[75] Inventor: Antonio Gray, Segrate, Italy

[73] Assignee: C. I. S. E., SpA, Italy

[21] Appl. No.: 315,075

[22] Filed: Oct. 26, 1981

[30] Foreign Application Priority Data

Oct. 27, 1980 [IT] Italy ............................. 25596 A/80
Jan. 28, 1981 [IT] Italy ............................. 19378 A/81

[51] Int. Cl.³ ................... H04M 11/00; H04M 9/08
[52] U.S. Cl. ................................................ 179/2 C
[58] Field of Search ............... 179/2 C, 1 C, 6.12, 179/6.19

[56] References Cited

U.S. PATENT DOCUMENTS

| 2,048,604 | 7/1936 | Finch | 179/2 C |
| 2,381,097 | 8/1945 | Adams | 179/2 C |
| 3,100,818 | 8/1963 | Carter | 179/2 C X |
| 3,535,456 | 10/1970 | Wilson | 179/2 C |
| 3,818,140 | 6/1974 | Green et al. | 179/2 C |
| 4,115,659 | 9/1978 | Spanel et al. | 179/2 C X |

FOREIGN PATENT DOCUMENTS 553837 of 1956 Italy ............................. 179/1 C
56-68048 8/1981 Japan ............................. 179/2 C

OTHER PUBLICATIONS

Ford Industries, Inc. Publication, "For Data Coupler/-Modems, Low-Speed Data Transmission Anyway You Like It", 1971.
Prentice Electronics Corp. Publication, "Prentice DC22, The Universal Data Coupler", 1970.

Primary Examiner—G. Z. Rubinson
Assistant Examiner—James L. Dwyer
Attorney, Agent, or Firm—Karl W. Flocks; A. Fred Starobin

[57] ABSTRACT

This invention relates to a device which permits to transmit and to receive signals through a telephone line by means of an electromagnetic linking brought about in correspondence with at least one inductive element of a telephone set, without any necessity of interrupting the line which feeds the set concerned.

4 Claims, 7 Drawing Figures

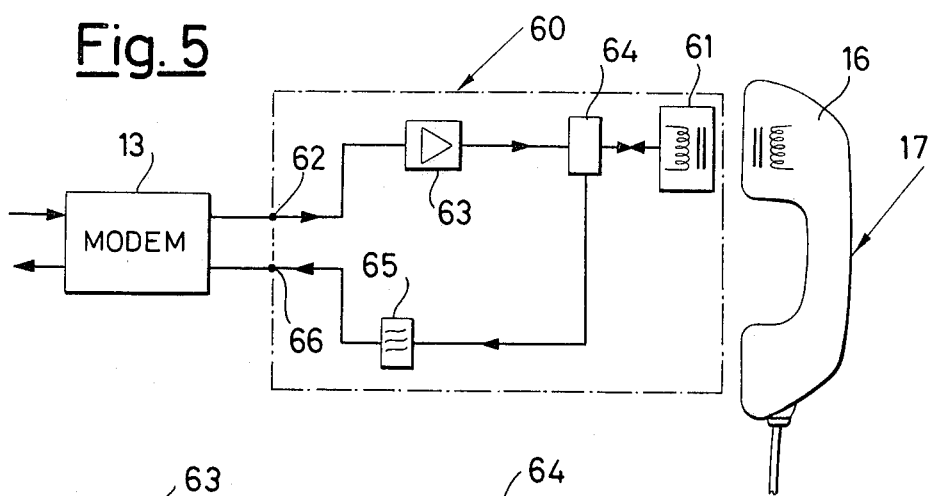
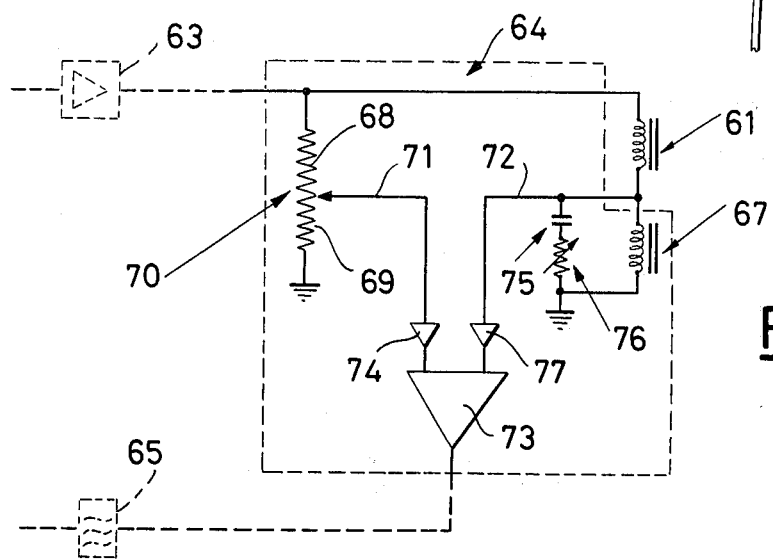
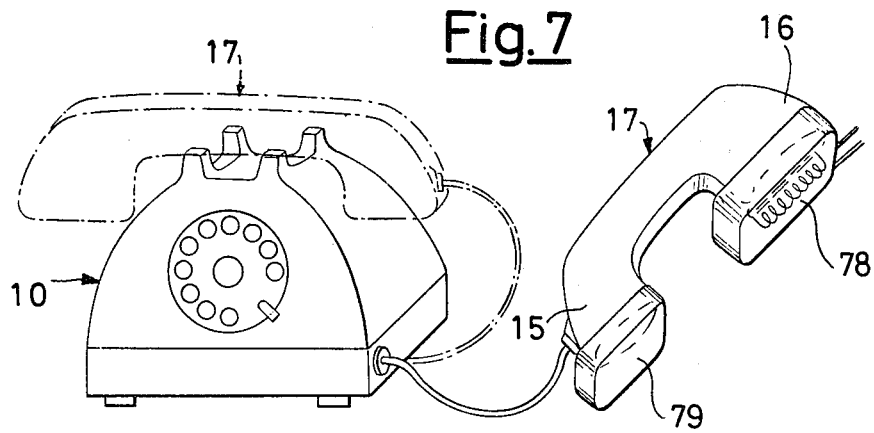

ELECTROMAGNETIC TELEPHONE COUPLING DEVICE

Due to the widespread use of the computers, the necessity has been originated of transmitting data of any kind to and from remote apparatus.

In general, the simplest method, especially in town areas, is to utilize the telephone lines as a support for the transmission of the data. The procedure which is most widely adopted is to serially transmit the data expressed in digital form by modulating one or more carrier frequencies which have been properly selected as to amplitude (AM), or frequency (FM) or phase (PM).

The apparatus for modulation and demodulation are generally called the MODEMs. They require, for a correct operation, that the wires of a telephone pair are cut, for example those entering a telephone set. The interruption of the wires is not always a feasible operation and is not even a quick one, and, at any rate, is not rapidly reversible especially in those installation in which there is no plug for the telephone set.

In order that these defects may be offset, there have been envisaged and marketed in the recent years, certain MODEMs which do not require the interruption of the telephone line and which utilize an acoustical link through the microphone and the receiver of the telephone set.

Such devices have a comparatively moderate cost but generally permit that data be transmitted only at a low speed (about 300 Baud) and that only the FM approach may be used.

In addition, the transmission so effected does not have certainly a high degree of reliability. As a mater of fact, the signals undergo, during the transmission, four conversions, viz.: electric-acoustical-electric-acoustical and eventually electric.

These transitions involve the inertia and the response curve of the acoustical transducers, both during transmission and receipt, by introducing amplitude and phase errors and impulsive troubles due to the microphones.

To offset the drawback of having to interrupt the telephone wire, to do away with the restrictions and the defects which are typical of the acoustical link, a device has been envisaged and embodied for coupling a conventional MODEM to a telephone line so as to retain the advantages of the wire interruption MODEM without suffering from the disadvantages of acoustical couplers, while concurrently dispensing with the necessity of interrupting the telephone line or of any other modification to the existing installations.

It has been ascertained, in fact, that it is possible to feed an encoded signal to the telephone line through the inductive rather than through the ohmic route, by utilizing the component parts which are conventionally present in a telephone set and more particularly exploiting the presence of inductive elements which are responsive to the variations of magnetic flux, such as those components which are contained in the line transformer, in the acoustical-electric transducer of the microphone or of the receiver.

Thus, according to the invention, a device is provided, which comprises a signal input and a signal output connected to means for the electromagnetic linking and intended to be arranged in the vicinity of at least an inductive element of a telephone set, said electromagnetic linking means being adapted to transmit to said inductive element the signal coming from said input and to send to said output the signal received by said inductive element.

Figure 2:
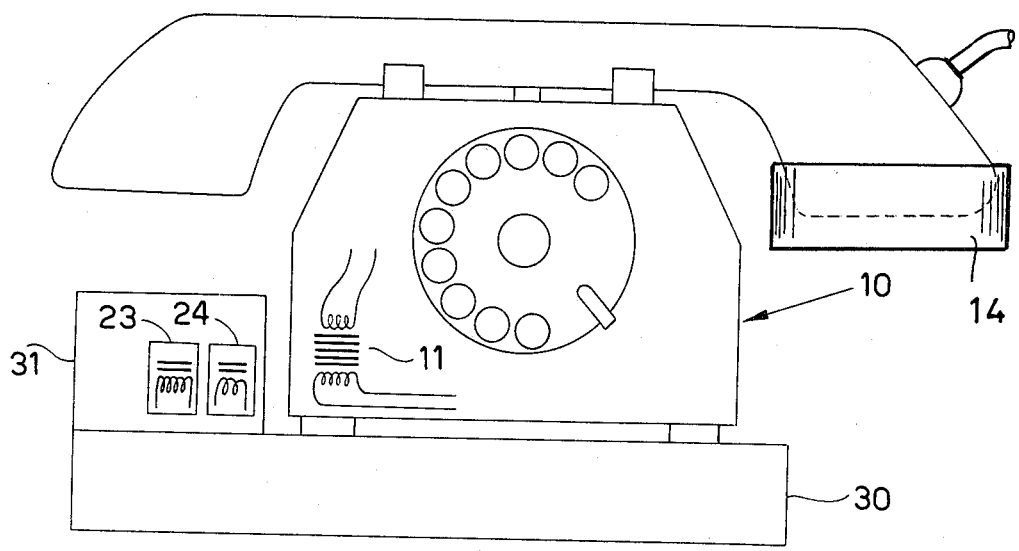
Figure 3:
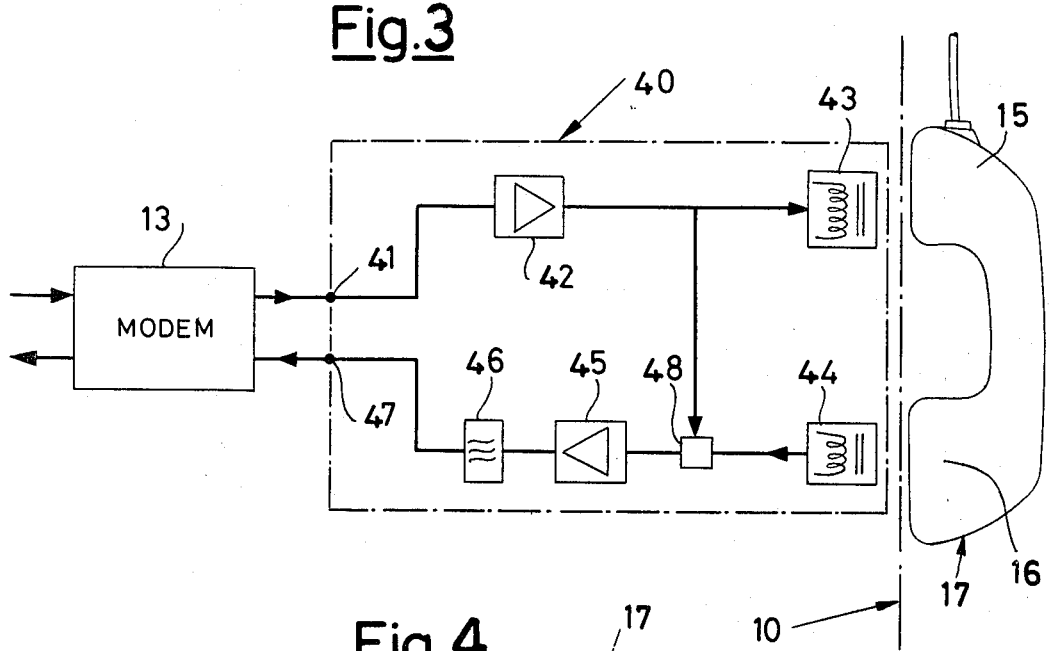
Figure 4:
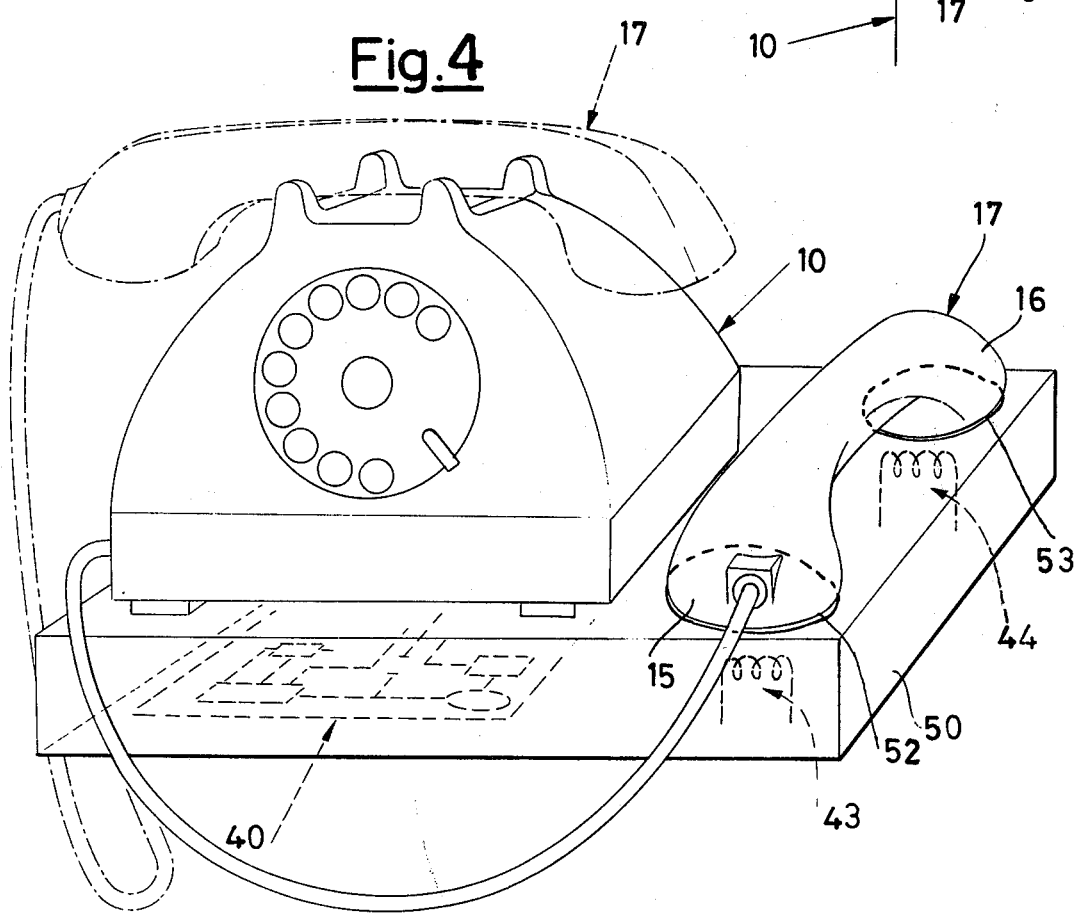

In order that the objectives and the features of the invention may be best understood, three exemplary embodiments of the invention will be described hereinafter without limitation, to be illustrated in the accompanying drawings, wherein:

FIG. 1 is an overall block diagram of a first embodiment of the device of this invention, FIG. 2 is a diagrammatical view of a practical embodiment of said first device shown in FIG. 1, FIG. 3 is a general block diagram of a second embodiment of the device according to the invention, FIG. 4 is a diagrammatical view of a practical embodiment of the second device, shown in FIG. 3, FIG. 5 shows an overall block diagram of a third device according to the invention, FIG. 6 is a close-up view of one of the blocks of the third device shown in FIG. 5, and FIG. 7 is a diagrammatical view of a practical embodiment of the third device shown in FIG. 5.

Having now reference to the drawings, in FIG. 1 there is indicated at 10 a conventional telephone set in which, more particularly, the line transformer 11 is shown, to which the telephone line 12 is connected.

The first embodiment according to the invention as shown in FIG. 1, indicated generally at 20, comprises an input 21, connected to the output of a MODEM 13 of conventional make, thus receiving an encoded signal, modulated according to any of the conventional procedures as outlined above.

The input 21 is connected to a linear current amplifier 22, the output of which feeds the coil of a bobbin 23 (with or without a core) arranged in the close vicinity of the line transformer 11.

Still in close adjacency with said transformer 11, there is provided a magnetic field intensity sensor such as a coil 24 (with or without a core), the coiling of which feeds a linear current amplifier 25.

The amplified signal is filtered at 26 and reaches the output 27 of the device, the latter being connected, in turn, to the input of the MODEM.

A cutoff device 28 is arranged, as shown, between the sensor 24 and the amplifier 25, the latter being driven so as to cut off the connection if so desired whenever an amplified signal is sent from 22 to 23.

The operability of the device shown in FIG. 1 is thus as follow;

The signal delivered by the MODEM, properly amplified by the amplifier 22, feeds the coil 23: the interlinking of the magnetic circuits of the coil 23 and the transformer 11 induces in the telephone line 12 an electric signal which, it has been ascertained, corresponds with a good linearity as to amplitude, frequency and phase, to the signal sent by the MODEM to the device 20.

The interlinking head 24 acts with an operation sequence which is entirely akin to the one just now described, but reversed. In the coiling of 24 a current is induced which linearly corresponds to the line current flowing in the winding of the transformer 11.

It is apparent that the configuration of the sensor 24 could be different from that of the coiling and could be embodied, for example, by a Hall-effect sensor.

The signal drawn by the sensor is properly filtered at 26 so as to suppress the noises of the telephone line and of the environment.

The cutoff device diagrammatically shown at 28 can be embodied in a number of ways and it can act as a line switch or as a zeroizing (or reducing) device for the gain of the amplifier 25, because it has merely the task of preventing the magnetic field of the transmitter 23, which has a high power, may originate the delivery of an eddy signal at the output 27 of the device.

The device of FIG. 1 may take an external shape such as shown in FIG. 2, or it may comprise a baseplate 30 which defines the position of the telephone set 10 resting thereon, in order that the line transformer of the set is close to the interlinking heads for transmission and receipt, 23, 24, respectively, as housed in an appropriate casing 31.

Provision is made for a sound-dampening hood 14 to be arranged onto the microphone so as to dispose of the noises of acoustical origin.

In FIG. 3 there is shown the second device according to the invention, generally indicated at 40.

In the FIGURE in point, at 10 is indicated, again, a conventional telephone set, in which, however, there have been specially made conspicuous the acoustical-electric transducers, namely the microphone 15 and the receiver 16.

This second embodiment of the device according to the invention comprises an input 41, connected on either side to the output of the MODEM 13 and on the other side to a linear current amplifier 42, the output of the latter feeding the winding of a coil 43 (with or without a core), which is arranged in close proximity relative of the transducer 15: this member can be a microphone comprising a flux sensor element, as a dynamic microphone has.

Close to the receiver 16 a magnetic flux intensity sensor is provided, such as for example a coil 44 (with or without a core), the winding of which feeds a linear current amplifier 45.

The amplified signal is filtered at 46 and reaches the output 47 of the device: such output, in its turn, is connected to the input of the MODEM.

A cutoff device 48 is shown as being inserted between the sensor 44 and the amplifier 45, so as to cut off the connection, if so desired, when an amplified signal is fed from 42 to 43.

The operation of the device shown in FIG. 3 is thus as follows:

The signal delivered by the MODEM, as properly amplified by the amplifier 42, feeds the coil 43. The interlinking of the magnetic circuits of the coil 43 and the microphone 15 induces in the telephone line an electric signal which has proven to correspond, with a satisfactory linearity, as to amplitude, frequency and phase, to the signal fed by the MODEM to the device 40.

The interlinking head 44 acts with a mode of operation which is similar to the foregoing but its function is, however, reversed.

In the winding of the coil 44 a current is induced, which linearly corresponds to the line current which circulates in the coiling of the receiver 16.

It is apparent that the configuration of the sensor 44 may differ from that of the coil; for example, it may have a Hall-effect sensor pattern.

The signal drawn by the sensor is properly filtered at 46 so as to suppress the noises of the telephone line and of the environment.

Quite similarly to what has been set forth hereinbefore, the cutoff device diagrammatically shown at 48 can have a large number of embodiments and can act as a line cutoff switch, a zeroizing (or reducing) device relative to the gain of the amplifier 45, inasmuch as it merely aims to avoiding that the magnetic field of the transmitter 43, which has a high power, may cause the delivery of an eddy signal at the output 47 of the device.

This second embodiment may take an external configuration such as shown in FIG. 4, or, as an alternative, it may comprise a baseplate 50 which defines the position of the set 10 and of the telephone handset 17 resting on the respective cradle so that the receiver and the transmitting member, respectively, housed in appropriate seatings 52 and 53, are in close proximity relative to the interlinking heads for transmission and receipt 43 and 44.

In FIG. 5 the third embodiment according to the invention is shown and is generally indicated at 60.

Differently from what has been shown and described in connection with the first two embodiments, said third device provides, for the transmission and receipt of signals through a telephone set, a single coil 61 (with or without a core), which is arranged in the close vicinity of the receiving portion 16 of the telephone 17.

The device 60 comprises an input 62 connected on either side to the output of the MODEM 13 and on the other side to a linear current amplifier 63, the output of which feeds the winding of the coil 61 through a signal-separator circuit 64 to be illustrated in detail in FIG. 6.

The coil 61 acts, as outlined above, also as a sensor of the intensity of a magnetic field and is consequently connected, still via the circuit 64, to a filter 65 the output of which is connected to an output 66 of the device 60; the latter output is connected, in its turn, to the input of the MODEM 13.

The circuit 64 for the separation of the signals, in combination with the coil 61, makes up a typical bridge circuit. The four sides of the bridge are the coil 61 as such, a second coil 67 and two sections, 68 and 69, of a resistor 70 which is so split by a slider branch-off 71. The signal drawn from the slider 71 and the signal drawn, through a side 72 between the coil 61 and the coil 67 are fed to a differential amplifier 73 via an amplifier 74 and an amplifier 77, respectively.

The signal exiting the amplifier 73 is then sent to the filter 65.

Connected in parallel with the coil 67 there is a variable impedance composed of a capacitor 75 and a variable resistor 76, having the task of phase-tuning the coil 67 with the coil 61.

Such a bridge circuit is balanced during calibration by manipulating the variable resistors 70 and 76.

The operation of the device just now described is as follows:

The signal delivered by the MODEM 13, properly amplified by the amplifier 63, feeds, through the circuit 64, the coil 61. The interlinking of the magnetic circuits of the coil 61 and the inductive element of the receiver 16 induces in the telephone line an electric signal which, just as for the other devices, has proven to correspond with a fair linearity, as to amplitude, frequency and phase, to the signal delivered by the MODEM to the device 60.

In this stage, there is no signal feedback from the circuit 64 to the MODEM via the filter 65. This is due to the fact that the bridge circuit fed by the transmission signal exiting the MODEM, delivers, by virtue of its balanced condition, the same signal both on the side 71 and the side 72. Thus, there will be no signal appearing at the output of the differential amplifier 73.

The coil 61 also acts, as outlined above, as a sensor of the intensity of the magnetic field. The signal coming from the telephone line reaches the inductive element of the receiver 16 and, by virtue of the interlinking of the magnetic circuits of the receiver 16 and the coil 61, induces an e.m.f. at the coil ends. This fact brings about an unbalance in the bridge circuit so that a voltage difference appears between the side 72 and the side 71. At the exit from the differential amplifier 73 a signal will appear, which is equal to the signal which had been received by the telephone line.

This third embodiment, 60, of the device in question may take an external outline similar to that of FIG. 4 for the device 40, but it should be borne in mind that the device 40 has a coil for the transmission and a coil for the receipt, whereas the device 60 has a single coil with a twofold function, which must lie in correspondence with the receiver 16. As a simplified alternative, however, the device may take the form of a hood 78 housing the device 60, or merely the coil 61, and adapted to be applied to the receiver 16 as depicted in FIG. 7. In the latter case shown herein, an additional sound-dampening hood 79 is provided so as to suppress the noise caused by purely acoustical sources.

Quite surprisingly, the operation of the devices has proven to be satisfactory for the transmission and receipt of signals with a fair linearity, as to amplitude, frequency and phase, irrespective of the kind of modulation which is adopted. Such devices can be used for the transmission of signals to and from any source, that is, not only signals of interest for the MODEMs and like apparatus for modulating and demodulating computer data, but also for apparatus adapted to transmit pictures, remote alarm signals, digitized transmission of voices and like applications.

Such devices do not certainly compel anyone to modify the existing installations: in addition, they can be installed both easily and quickly and have a cost and performances equivalent to those of the devices which require the interruption of the telephone line concerned.

Also the transmission velocity can be high, up to the limits of operability imposed by the same circuits of the telephone set, with particular reference to the amplifiers and the filters installed in the telephone exchanges.

For example, with properly designed lines, it may become possible to attain 20 kb/sec.

In addition, a very satisfactory separation is obtained between the received and the transmitted signal, with a good signal-to-noise ratio.

It is obvious that the configurations and the particular features of the device may be changed widely as a function of the individual application, within the scope of the invention.

I claim:

1. A device for the transmission and the receipt of electronic signals through a telephone line to which a telephone set is connected having inductive elements composed at least of the line transformer of the telephone set, the acoustical-electric-transducer of the microphone of the telephone set, and the acoustical-electric transducer of of the receiver of the telephone set comprising a signal input and a signal output connected to electromagnetic interlinking means including a main coil and a secondary coil which are positioned in close proximity to at least one of the inductive elements of the telephone set, said electromagnetic interlinking means being adapted to transmit to the inductive element the signal coming from said signal input and to send to said signal output the signal received by the inductive element, said signal input and said signal output both being connected to said main coil through a signal separation circuit for the signal transmitted by said signal input to said main coil through a linear amplifier and for the signal sent by said main coil to said output through a band-pass filter, said main coil being positioned in the vicinity of one of the inductive elements of the telephone set, said separator circuit including a balanced bridge circuit wherein two consecutive sides of said balanced bridge circuit are formed by said main coil and said secondary coil, said two sides being fed at the ends of said coils at which they are not connected to each other with the signal transmitted by said signal input, the signal which is present between said two coils and the signal which is present between impedances in the remaining two sides of said balanced bridge circuit being separately fed, each through a linear amplifier, to a differential amplifier having its output connected to the input of said band-pass filter.

2. The device according to claim 1, further characterized in that said main coil is associated to the acoustical-electric transducer of the receiver of the telephone set.

3. The device according to claim 1, further characterized in that it comprises a casing having the form of a baseplate for the telephone set in a preselected position, said main coil being secured to said baseplate in the vicinity of the position taken by one of the inductive elements of the telephone set resting on said baseplate.

4. The device according to claim 1, further characterized in that it comprises a casing in the form of a hood adapted to be placed in correspondence with the acoustical-electric transducer of the telephone set.

* * * * *